(12) United States Patent
Huang

(10) Patent No.: US 10,692,113 B2
(45) Date of Patent: Jun. 23, 2020

(54) METHOD FOR PROVIDING CUSTOMIZED INFORMATION THROUGH ADVERTISING IN SIMULATION ENVIRONMENT, AND ASSOCIATED SIMULATION SYSTEM

(71) Applicant: HTC Corporation, Taoyuan (TW)

(72) Inventor: Chun-Wei Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 432 days.

(21) Appl. No.: 15/586,266

(22) Filed: May 3, 2017

(65) Prior Publication Data

US 2017/0364960 A1  Dec. 21, 2017

Related U.S. Application Data

(60) Provisional application No. 62/352,568, filed on Jun. 21, 2016.

(51) Int. Cl.
*G06Q 30/00* (2012.01)
*G06Q 30/02* (2012.01)
(Continued)

(52) U.S. Cl.
CPC ......... *G06Q 30/0269* (2013.01); *G06Q 20/40* (2013.01); *G06Q 20/40145* (2013.01); *G06Q 30/0277* (2013.01); *G06Q 30/0643* (2013.01)

(58) Field of Classification Search
None
See application file for complete search history.

(56) References Cited

U.S. PATENT DOCUMENTS

| 9,256,282 | B2 * | 2/2016 | Latta | G06F 3/017 |
| 2002/0040332 | A1 * | 4/2002 | Maari | G06Q 10/087 |
| | | | | 705/26.5 |

(Continued)

FOREIGN PATENT DOCUMENTS

CN  105069644 A  11/2015

OTHER PUBLICATIONS

Office action dated Sep. 17, 2018 for the Taiwan application No. 106119066, filing date Jun. 8, 2017, pp. 1-9.
(Continued)

*Primary Examiner* — Matthew T Sittner
(74) *Attorney, Agent, or Firm* — Winston Hsu

(57) ABSTRACT

A method for providing customized information through advertising in a simulation environment and associated simulation system are provided. The method includes: controlling a head mounted display (HMD) device of the simulation system to present the simulation environment and allow a user of the simulation system to see the simulation environment when wearing the HMD device on the user's head; controlling the HMD device to display a first controller in the simulation environment, to allow the user to interact with the simulation environment; controlling the HMD device to display an advertisement as a service trigger object in the simulation environment, to allow the user to trigger a specific service related to ordering commercial products in the simulation environment; and after the specific service is triggered through the service trigger object, controlling the HMD device to display a second controller in the simulation environment to match simulation contents of the specific service.

14 Claims, 10 Drawing Sheets

(51) Int. Cl.
*G06Q 30/06* (2012.01)
*G06Q 20/40* (2012.01)

(56) References Cited

U.S. PATENT DOCUMENTS

| | | | |
|---|---|---|---|
| 2010/0030578 A1 | 2/2010 | Siddique | |
| 2011/0213664 A1 | 9/2011 | Osterhout | |
| 2012/0214587 A1* | 8/2012 | Segal | A63F 13/428 |
| | | | 463/30 |
| 2012/0314942 A1* | 12/2012 | Williams | G06T 19/006 |
| | | | 382/164 |
| 2013/0085345 A1* | 4/2013 | Geisner | G06Q 30/00 |
| | | | 600/300 |
| 2013/0169683 A1* | 7/2013 | Perez | G02B 27/02 |
| | | | 345/633 |
| 2013/0293530 A1 | 11/2013 | Perez | |
| 2013/0328930 A1* | 12/2013 | Lee | G06T 19/006 |
| | | | 345/633 |
| 2014/0100996 A1* | 4/2014 | Klein | G06Q 30/0643 |
| | | | 705/27.2 |
| 2014/0129336 A1* | 5/2014 | Bailey | G06Q 30/0261 |
| | | | 705/14.58 |
| 2014/0168261 A1* | 6/2014 | Margolis | G06F 3/011 |
| | | | 345/633 |
| 2015/0081267 A1* | 3/2015 | Conroy | G05B 17/02 |
| | | | 703/21 |
| 2015/0193869 A1* | 7/2015 | Del Vecchio | G06Q 40/02 |
| | | | 705/42 |
| 2015/0294342 A1* | 10/2015 | Hertel | G06Q 30/0226 |
| | | | 705/14.27 |
| 2016/0019717 A1* | 1/2016 | Yopp | G06Q 10/067 |
| | | | 345/633 |
| 2016/0041388 A1* | 2/2016 | Fujimaki | G02B 27/017 |
| | | | 345/2.1 |
| 2016/0063474 A1* | 3/2016 | Spencer, II | G06Q 50/34 |
| | | | 705/39 |
| 2016/0085366 A1* | 3/2016 | Chi | G06F 3/0488 |
| | | | 345/173 |
| 2016/0162020 A1* | 6/2016 | Lehman | G06F 3/013 |
| 2016/0171771 A1* | 6/2016 | Pedrotti | G02B 27/017 |
| | | | 345/633 |
| 2016/0189268 A1* | 6/2016 | Gandhi | G06Q 30/0623 |
| | | | 705/26.61 |
| 2016/0253843 A1* | 9/2016 | Lee | G06F 3/04815 |
| | | | 345/633 |
| 2016/0284136 A1* | 9/2016 | Johnston | G06T 19/006 |
| 2016/0300392 A1* | 10/2016 | Jonczyk | G06T 19/003 |
| 2017/0031997 A1* | 2/2017 | Merg | G07C 5/008 |
| 2017/0116667 A1* | 4/2017 | High | G06K 9/00671 |
| 2017/0206707 A1* | 7/2017 | Guay | G06F 16/2246 |
| 2017/0364960 A1* | 12/2017 | Huang | G06Q 30/0269 |

OTHER PUBLICATIONS

Office action dated Oct. 29, 2019 for the China application No. 201710455904.7, filing date Jun. 16, 2017, p. 1-14.

\* cited by examiner

METHOD FOR PROVIDING CUSTOMIZED INFORMATION THROUGH ADVERTISING IN SIMULATION ENVIRONMENT, AND ASSOCIATED SIMULATION SYSTEM

CROSS REFERENCE TO RELATED APPLICATIONS

This application claims the benefit of U.S. Provisional Application No. 62/352,568, which was filed on Jun. 21, 2016, and is incorporated herein by reference.

BACKGROUND OF THE INVENTION

1. Field of the Invention

The present invention relates to a head mounted display (HMD), and more particularly, to a method for providing customized information through advertising in a simulation environment, and an associated.

2. Description of the Prior Art

An HMD is typically implemented as a display device that a user may wear on his/her head in order to have video information directly displayed in front of the eyes. For example, the HMD may have either one or two small LCD or OLED displays and associated optical system(s) (e.g. one or more magnifying lenses and other optical elements), and the displays and the associated optical system(s) are typically embedded in a wearable device such as a helmet, glasses, etc. When the user wears this wearable device, the optical system(s) allow the user to have the perception that the images are coming from a greater distance, so eyestrain may be prevented. In some examples, the HMD may be implemented with a single display, and an image may be projected through an optical system that splits the image into two identical images and redirects the two images to the eyes, respectively. In some examples, the HMD may be implemented with two displays, in order to show stereoscopic images, where images of the same object with slightly different angles may be viewed together to create an impression of depth and solidity.

When the user is wearing the HMD and enjoying playing a game in a virtual reality (VR) world presented by the HMD, the user may feel bothered if it is needed to take off the HMD. For example, at dinner time, the user is typically forced to take off the HMD and leave the VR world, in order to make a phone call for food delivery. Although the user may go back to the VR world again after making the phone call, the pleasure of immersing himself/herself in the VR world is interrupted. Thus, a novel method and associated architecture are required for enhancing user experience.

SUMMARY OF THE INVENTION

It is therefore an objective of the claimed invention to provide a method for providing customized information through advertising in a simulation environment, and an associated simulation system, in order to solve the above-mentioned problems.

It is another objective of the claimed invention to provide a method for providing customized information through advertising in a simulation environment, and an associated simulation system, in order to enhance user experience.

According to at least one embodiment, a method for providing customized information through advertising in a simulation environment is provided, where the method is applicable to a simulation system. For example, the simulation system may be one of a virtual reality (VR) system, an augmented reality (AR) system, and a mixed reality (MR) system. The method may comprise: controlling a head mounted display (HMD) device of the simulation system to present the simulation environment and allow a user of the simulation system to see the simulation environment when wearing the HMD device on the user's head; controlling the HMD device to display a first controller in the simulation environment, to allow the user to interact with the simulation environment; controlling the HMD device to display an advertisement as a service trigger object in the simulation environment, to allow the user to trigger a specific service in the simulation environment; and after the specific service is triggered through the service trigger object, controlling the HMD device to display a second controller in the simulation environment to match simulation contents of the specific service, wherein the first controller is replaced with the second controller in the simulation environment.

According to at least one embodiment, a simulation system for providing customized information through advertising in a simulation environment, where the simulation system may be one of a VR system, an AR system, and an MR system. The simulation system may comprise an HMD device and a processing circuit that is coupled to the HMD device. The HMD device is configured to present the simulation environment and allow a user of the simulation system to see the simulation environment when wearing the HMD device on the user's head. In addition, the processing circuit is configured to perform information processing for the HMD device. For example, the processing circuit may control the HMD device to perform the following operations: displaying a first controller in the simulation environment to allow the user to interact with the simulation environment; displaying an advertisement as a service trigger object in the simulation environment, to allow the user to trigger a specific service in the simulation environment; and after the specific service is triggered through the service trigger object, displaying a second controller in the simulation environment to match simulation contents of the specific service, wherein the first controller is replaced with the second controller in the specific service.

According to at least one embodiment, a method for providing customized information through advertising in a simulation environment is provided, where the method is applicable to a simulation system. For example, the simulation system may be one of a VR system, an AR system, and an MR system. The method may comprise: controlling an HMD device of the simulation system to present the simulation environment and allow a user of the simulation system to see the simulation environment when wearing the HMD device on the user's head; controlling the HMD device to display a first controller in the simulation environment, to allow the user to interact with the simulation environment; controlling the HMD device to display an advertisement as a service trigger object in the simulation environment, to allow the user to trigger a specific service in the simulation environment; and after the specific service is triggered through the service trigger object, controlling the HMD device to display a menu of the specific service and display contact information for the specific service, to allow the user to make a phone call using the contact information without leaving the simulation environment.

The method and the associated simulation system may solve problems existing in the related arts without introducing unwanted side effects, or in a way that is less likely to introduce a side effect. For example, when the user is wearing the HMD device and is enjoying playing a game in the simulation environment (e.g. a VR environment, an AR environment, or an MR environment) presented by the HMD device, the user may order something as dinner at dinner time (more particularly, make a phone call for food delivery) in the simulation environment without taking off the HMD device, and therefore the pleasure of immersing himself/herself in the simulation environment will not be interrupted.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
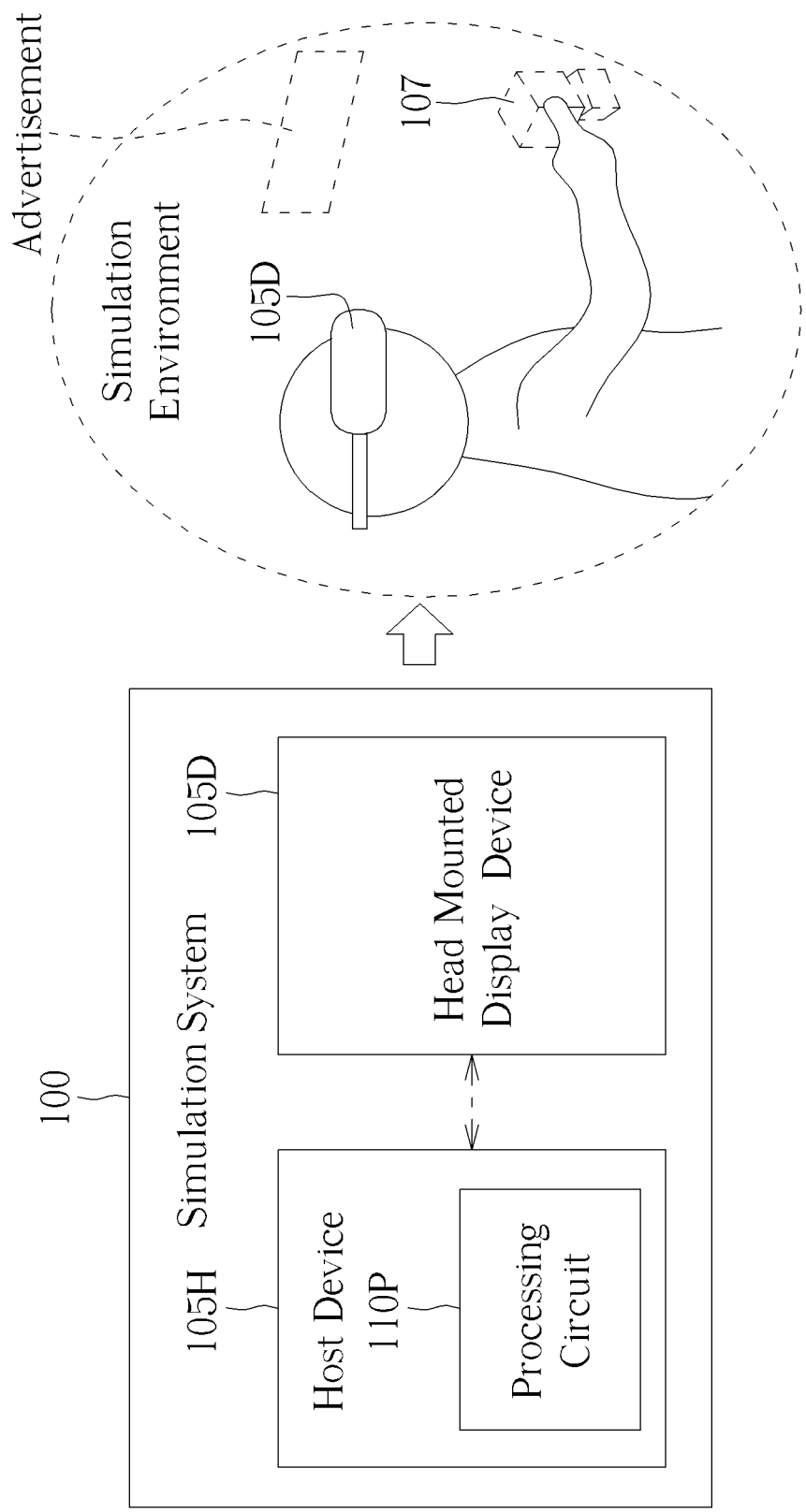
FIG. 1 is a diagram of a simulation system according to an embodiment of the present application.

FIG. 1 is a diagram of a simulation system 100 according to an embodiment of the present application, where the simulation system 100 may be configured to provide customized information through advertising in a simulation environment. For example, the simulation system 100 may be implemented as a virtual reality (VR) system, an augmented reality (AR) system, or a mixed reality (MR) system. As shown in FIG. 1, the simulation system 100 may comprise a host device 105H and a head mounted display (HMD) device 105D, and the host device 105H may comprise a processing circuit 110P. According to this embodiment, the host device 105H and the HMD device 105D are individual devices, and the processing circuit 110P of the host device 105H and the HMD device 105D may be coupled to each other through one or more wired connections or one or more wireless connections. Examples of the host device 105H may include, but not limited to, personal computers (PCs) (e.g. desktop computers and laptop computers), multifunctional mobile phones, and tablets.

The processing circuit 110P may control operations of the host device 105H, and the host device 105H (more particularly, the processing circuit 110P therein) may control operations of the HMD device 105D to interact with a user of the simulation system 100 when the user wears the HMD device 105D on his/her head. In addition, the HMD device 105D may be configured to present the simulation environment, such as a VR environment, an AR environment, or an MR environment. Under control of the processing circuit 110P, the HMD device 105D may present the simulation environment and allow the user of the simulation system to see the simulation environment (e.g. the VR environment, the AR environment, or the MR environment) when wearing the HMD device 105D on the user's head. As a result, the user wearing the HMD device 105D may see one or more virtual objects of the simulation environment, such as the virtual objects 107 viewed by the user. According to some embodiments, the designs of the HMD device 105D shown in the right half of FIG. 1 (e.g. the size, the shape and/or the style thereof) may vary. According to some embodiments, the designs of the virtual objects 107 shown in the right half of FIG. 1 (e.g. the size and/or the shape thereof) may vary.

According to the embodiment shown in FIG. 1, the processing circuit 110P may be configured to perform information processing for the HMD device 105D. For example, the processing circuit 110P may control the HMD device 105D to display one or more controllers in the simulation environment, such as two controllers (e.g. two virtual objects) in the simulation environment that correspond to two physical controllers to be held by two hands of the user, respectively, for allowing the user to interact with the simulation environment. The two virtual objects may be designed to be two virtual controllers respectively corresponding to the two physical controllers of the simulation system. The user may hold the physical controllers in the real space while virtually holding the two controllers (e.g. the two virtual objects) in the simulation environment. When needed, the user may move the physical controllers in the real space while virtually moving the two controllers in the simulation environment, and may press physical buttons on the physical controllers in the real space while virtually doing something in the simulation environment. This allows a person such as the user to play games in the simulation environment and immerse himself/herself in the simulation environment. Additionally, the processing circuit 110P may control the HMD device 105D to display one or more advertisements in the simulation environment, to allow the user to trigger one or more services related to ordering commercial products in the simulation environment. For example, when the user is wearing the HMD device 105D and is enjoying playing a game in the simulation environment (e.g. the VR environment, the AR environment, or the MR environment) presented by the HMD device 105D, the user may order something as dinner at dinner time (more particularly, make a phone call for food delivery) in the simulation environment without taking off the HMD device 105D, and therefore the pleasure of immersing himself/herself in the simulation environment will not be interrupted.

Figure 2:
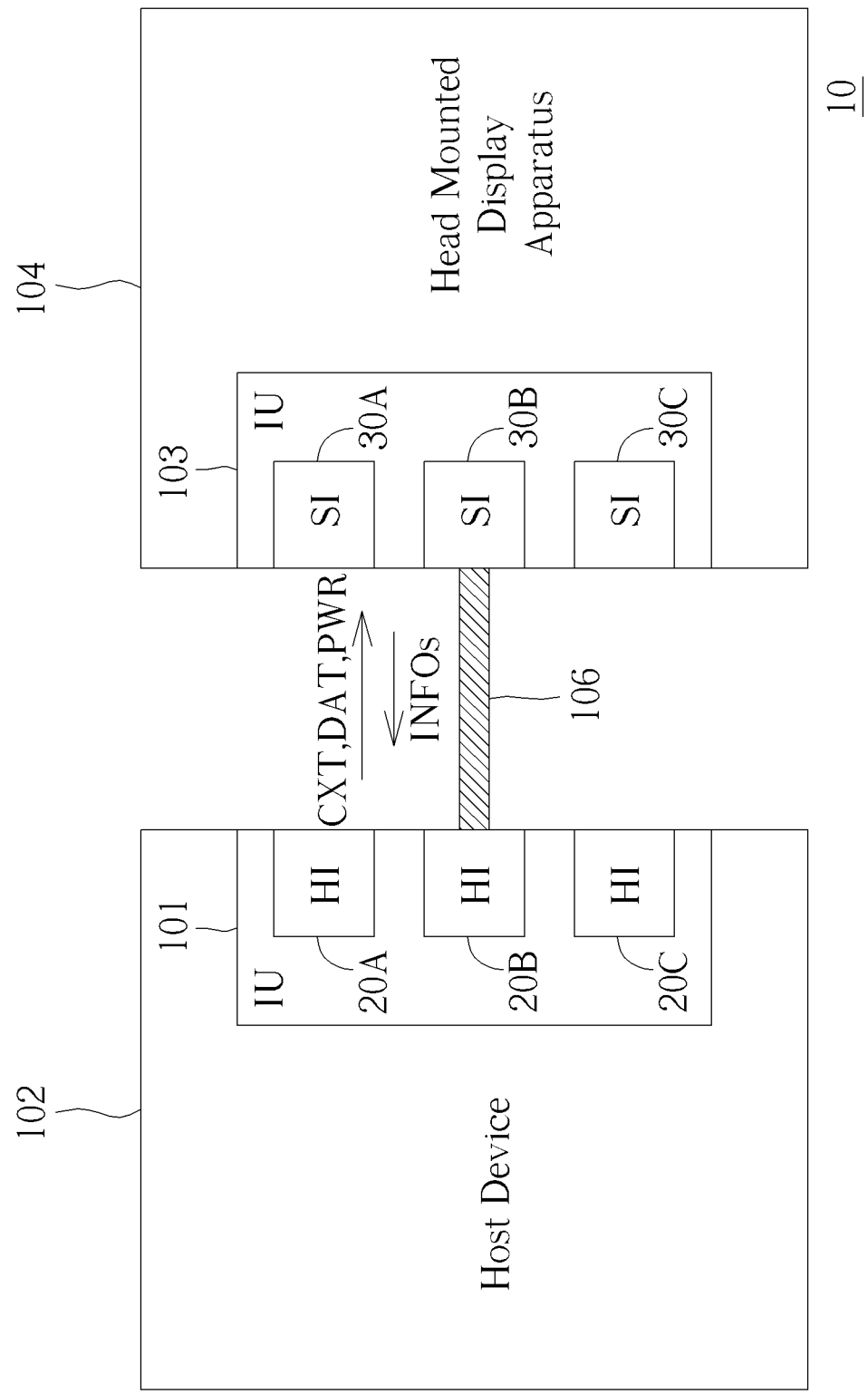
FIG. 2 illustrates a virtual reality (VR) system according to an embodiment of the present application, where the VR system shown in FIG. 2 can be taken as an example of the simulation system shown in FIG. 1.

FIG. 2 illustrates a VR system 10 according to an embodiment of the present application, where the VR system 10 shown in FIG. 2 can be taken as an example of the simulation system 100 shown in FIG. 1. The VR system 10 comprises a host device 102, a head mounted display (HMD) apparatus 104 to be worn by the user, and a transmission cable 106 (optional) connected between an interface unit (IU) 101 of the host device 102 and an interface unit (IU) 103 of the HMD apparatus 104. In the VR system 10, the host device 102 can be taken as an example of the host device 105H shown in FIG. 1, a processing circuit (e.g. one or more processors) within the host device 102 can be taken as an example of the processing circuit 110P shown in FIG. 1, and the HMD apparatus 104 can be taken as an example of the HMD device 105D shown in FIG. 1. The interface unit 101 of the host device 102 comprises a first host interface 20A for providing a multimedia content CXT to the HMD apparatus 104, a second host interface 20B for providing communication data DAT to the HMD apparatus 104, and a third host interface 20C for providing a power voltage PWR to power the HMD apparatus 104, where each of the first host interface 20A, the second host interface 20B, and the third host interface 20C may be labeled "HI" (which stands for "host interface") in FIG. 2, for brevity. Furthermore, the interface unit 103 of the HMD apparatus 104 has a first slave interface 30A capable of being coupled to the first host interface 20A via the transmission cable 106, a second slave interface 30B capable of being coupled to the second host interface 20B via the transmission cable 106, and a third slave interface 30C capable of being coupled to the third host interface 20C via the transmission cable 106, where each of the first slave interface 30A, the second slave interface 30B, and the third slave interface 30C may be labeled "SI" (which stands for "slave interface") in FIG. 2, for brevity. The HMD apparatus 104 is capable of playing the multimedia content CXT from the host device 102, and sensing information $INFO_S$ regarding the HMD apparatus 104 and/or the user. Based on the information sensed by the HMD apparatus 104, the host device 102 can timely modulate the multimedia content CXT. In one embodiment, the host device 102 is capable of processing a multimedia source and generating the multimedia content CXT according to the multimedia source and the information sensed by the HMD apparatus 104.

According to some embodiments, the host device 102 may comprise a computing device for generating the multimedia content CXT. The computing device may be a PC (e.g. a desktop computer or a laptop computer), or a smart phone or any other portable device with a powerful processor inside. The computing device can receive a multimedia source from a storage unit or Internet network, and the computing device is capable of generating the multimedia content CXT according to the multimedia source and the sensing information $INFO_S$ from the HMD apparatus 104. The computing device is also capable of generating the communication data according to the sensing information $INFO_S$. The host device 102 may further comprise a connection control unit coupled between the computing device and the transmission cable 106 shown in FIG. 2, wherein the connection control unit is capable of enhancing the signal strength of the communication data DAT and/or the sensing information $INFO_S$ communicated between the computing device and the connection control unit. Furthermore, the connection control unit can connect to a power source, so that the connection control unit is capable of transmitting the power voltage PWR to a power path of the transmission cable 106. In one embodiment, the connection control unit comprises a switch, which is used to control the supply of the multimedia content CXT, the communication data DAT, and/or the power voltage PWR to the transmission cable 106. Regarding some implementation details of the VR system 10 shown in FIG. 2, please refer to U.S. Patent Application Publication No. US 2016/0162012 A1 (filed on Nov. 12, 2015) and U.S. Patent Application Publication No. US 2016/0163110 A1 (filed on Nov. 17, 2015), which are incorporated herein by reference.

Figure 3:
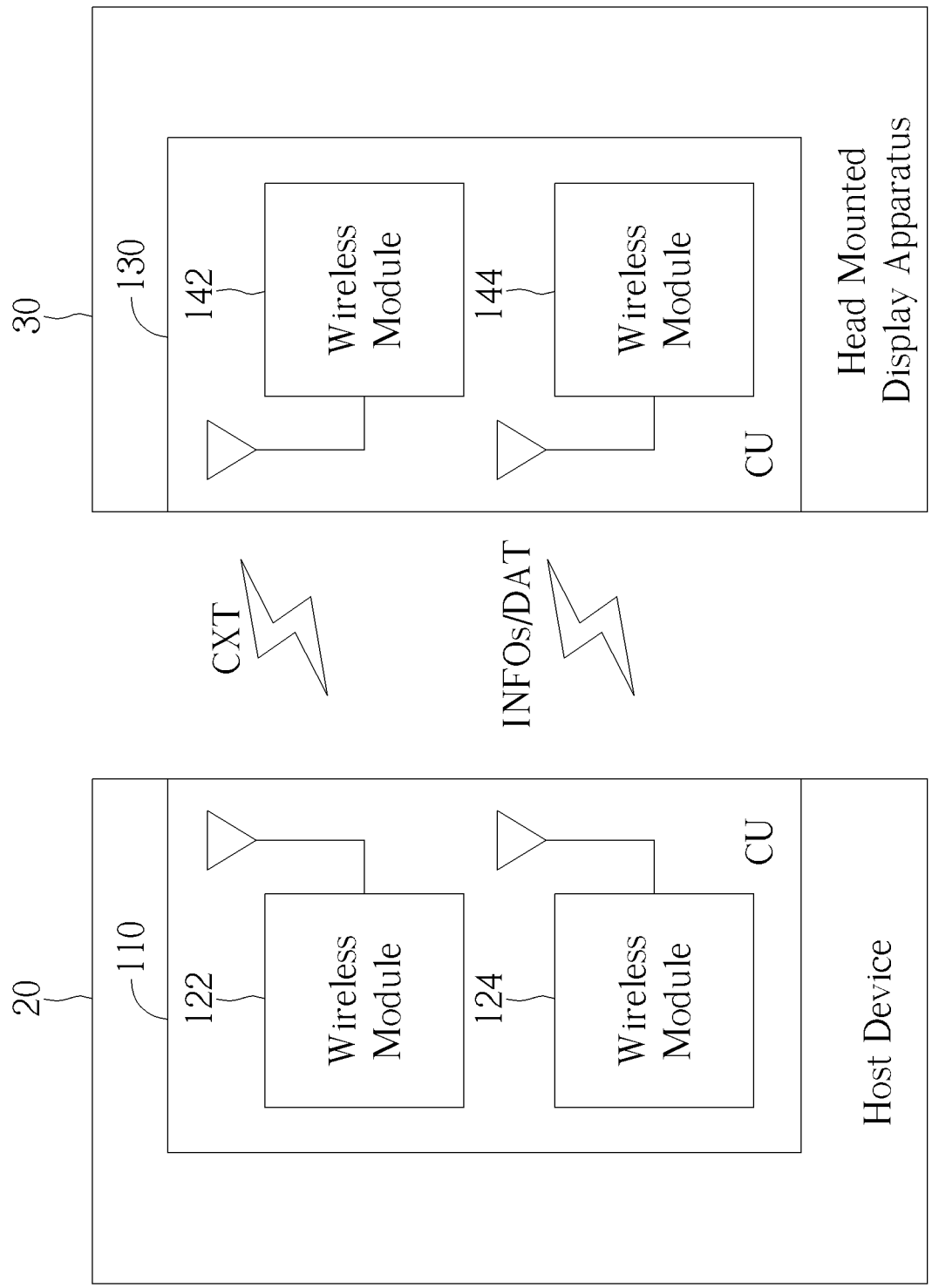
FIG. 3 illustrates a VR system according to another embodiment of the present application, where the VR system shown in FIG. 3 can be taken as an example of the simulation system shown in FIG. 1.

FIG. 3 illustrates a VR system according to another embodiment of the present application, where the VR system shown in FIG. 3 can be taken as an example of the simulation system 100 shown in FIG. 1. The VR system shown in FIG. 3 comprises a host device 20 and a head mounted display (HMD) apparatus 30 to be worn by the user. In this VR system, the host device 20 can be taken as an example of the host device 105H shown in FIG. 1, a processing circuit (e.g. one or more processors) within the host device 20 can be taken as an example of the processing circuit 110P shown in FIG. 1, and the HMD apparatus 30 can be taken as an example of the HMD device 105D shown in FIG. 1. A communication unit (CU) 110 of the host device 20 comprises a wireless module 122 for providing a multimedia content such as the multimedia content CXT mentioned above to the HMD apparatus 30, and a wireless module 124 for providing communication data such as the communication data DAT mentioned above to the HMD apparatus 30. The HMD apparatus 30 is capable of playing the multimedia content CXT from the host device 20, and obtaining the sensing information $INFO_S$ regarding the HMD apparatus 30 and/or the user wearing the HMD apparatus 30. A communication unit (CU) 130 of the HMD apparatus 30 comprises a wireless module 142 for receiving the multimedia content CXT from the host device 20, and a wireless module 144 for receiving the communication data DAT from the host device 20 and providing the sensing information $INFO_S$ to the host device 20. Based on the information sensed by the HMD apparatus 30, the host device 20 can timely modulate the multimedia content CXT. In one embodiment, the host device 20 is capable of processing a multimedia source and generating the multimedia content CXT according to the multimedia source and the information sensed by the HMD apparatus 30. It should be noted that the wireless module 122 of the host device 20 and the wireless module 142 of the HMD apparatus 30 support the same wireless technology (e.g. Bluetooth, Wi-Fi, etc.), and the wireless module 124 of the host device 20 and the wireless module 144 of the HMD apparatus 30 support the same wireless technology (e.g. Bluetooth, Wi-Fi, etc.).

According to some embodiments, the host device 20 may further comprise a computing device for generating the multimedia content CXT. The host device 20 may be a PC (e.g. a desktop computer or a laptop computer), a tablet PC, a smartphone, or any other portable device with a powerful processor inside. The computing device can receive a multimedia source from a storage unit or Internet network, and the computing device is capable of generating the multimedia content CXT according to the multimedia source and the sensing information $INFO_S$ from the HMD apparatus 30. The computing device is also capable of generating the communication data DAT according to the sensing information $INFO_S$. Regarding some implementation details of the VR system shown in FIG. 3, please refer to U.S. Patent Application Publication No. US 2016/0163283 A1 (filed on Nov. 24, 2015), which is incorporated herein by reference.

Figure 4:
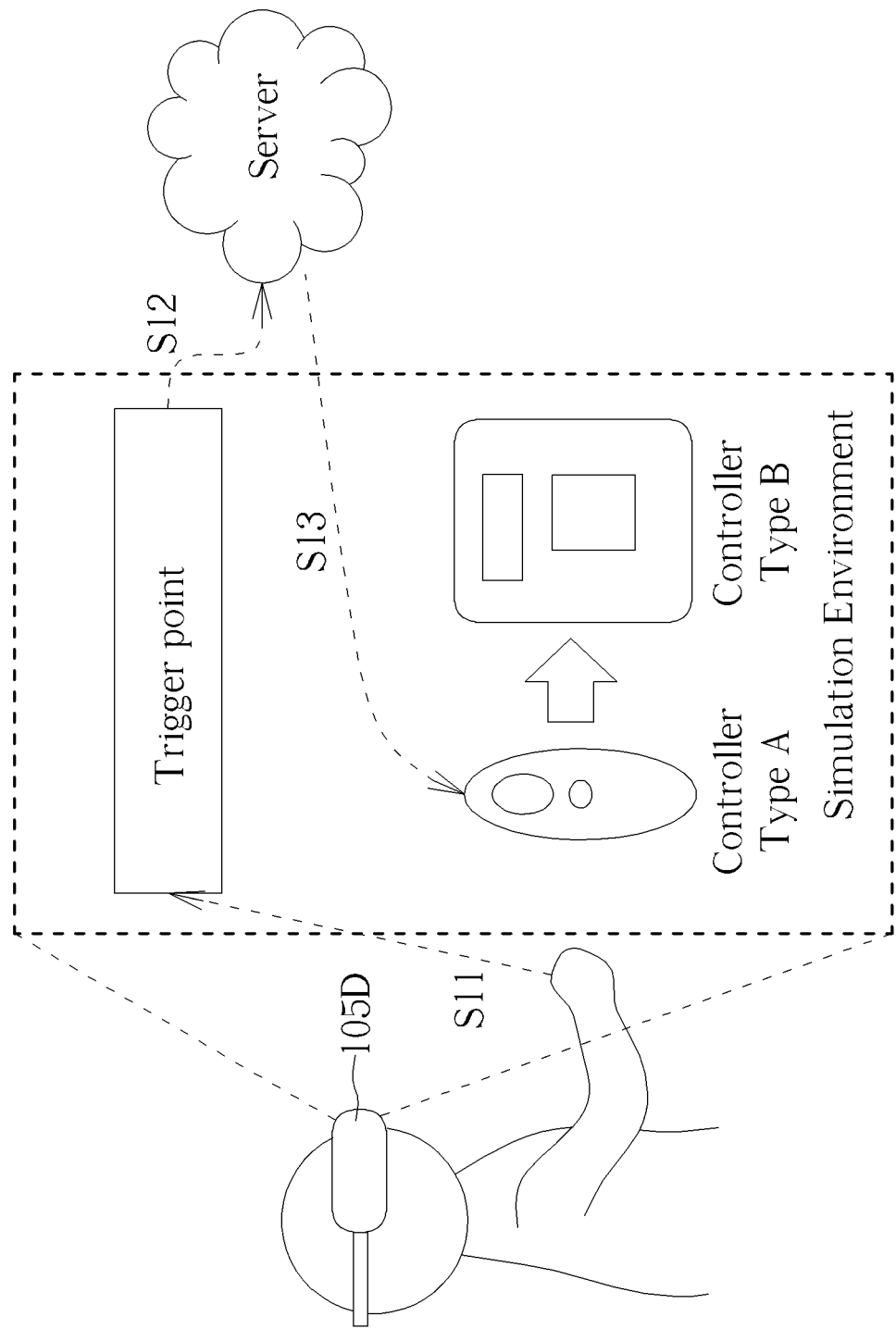
FIG. 4 illustrates a model presentation control scheme applied to the simulation system shown in FIG. 1 according to an embodiment of the present application.

FIG. 4 illustrates a model presentation control scheme applied to the simulation system 100 shown in FIG. 1 according to an embodiment of the present application. Based on the architecture shown in FIG. 1, the processing circuit 110P is capable of controlling the HMD device 105D to present the simulation environment and allow the user of the simulation system 100 to see the simulation environment when wearing the HMD device 105D on the user's head. In this embodiment, the processing circuit 110P may control the HMD device 105D to display a first controller (e.g. the controller of "controller type A" as shown in FIG. 4) in the simulation environment to allow the user to interact with the simulation environment. The first controller can be taken as an example of one of the two controllers mentioned above. For example, the physical controllers mentioned above may have similar sizes and similar shapes, or may have the same size and the same shape. The physical controllers may be designed to be suitable for the user to hold in his/her hands, respectively, and the size and the shape of the controller type A may be similar to the physical controllers. Please note that the processing circuit 110P may control the HMD device 105D to display another first controller (e.g. another controller of "controller type A") in the simulation environment to allow the user to interact with the simulation environment. The other first controller can be taken as an example of the other of the two controllers mentioned above. For example, the aforementioned first controller may be a left hand controller virtually held by the left hand of the user in the simulation environment, while the other first controller may be a right hand controller virtually held by the right hand of the user in the simulation environment.

In addition, the processing circuit 110P may control the HMD device 105D to display an advertisement as a service trigger object (e.g. the trigger point shown in FIG. 4) in the simulation environment, to allow the user to trigger a specific service in the simulation environment. The specific service may be related to ordering commercial products, and more particularly, may be related to ordering the commercial products in the simulation environment. For example, the service trigger object may be designed to be a banner, a virtual button, or any of other types of video objects. Before the specific service is triggered through the service trigger object, both of the left hand controller and the right hand controller are displayed as the controller type A. In Step S11, when the user is interested in this advertisement, the user uses the other first controller such as the right hand controller to trigger the specific service through the service trigger object (e.g. the banner). In Step S12, when the specific service is triggered, the processing circuit 110P controls the host device 105H to send a request to a server that provides the specific service. The server receives the request and sends back the associated VR contents to the host device 105H. The associated VR contents may comprise virtual menu contents of a menu, and the processing circuit 110P may control the HMD device 105D to display the menu (which may be designed as an online order page, for example). In this embodiment, after the specific service is triggered through the service trigger object, the processing circuit 110P may control the HMD device 105D to display a second controller (e.g. the controller of "controller type B" as shown in FIG. 4) in the simulation environment to match simulation contents (e.g. VR contents) of the specific service, where the aforementioned first controller such as the left hand controller is replaced with the second controller in the specific service. For example, the size and the shape of the controller type B may be designed to be similar to that of a tray for putting food thereon. As shown in FIG. 4, in Step S13, the server sends the VR contents of the controller type B to the simulation system 100 (e.g. the host device 105H). According to the VR contents of the controller type B from the server, the processing circuit 110P controls the HMD device 105D to display the second controller as the left hand controller in the specific service. For example, the associated VR contents mentioned above may comprise the VR contents of the controller type B. Thus, the server may generate or provide the object of the second controller (e.g. the VR contents of the controller type B), and the processing circuit 110P may control the HMD device 105D to display the second controller in the specific service. According to some embodiments, the host device 105H (e.g. the processing circuit 110P) may generate or provide the object of the second controller (e.g. the VR contents of the controller type B), and may control the HMD device 105D to display the second controller in the specific service. Please note that the architecture of the host device 105H may vary. According to some embodiments, the server and the host device 105H may be integrated into the same device. For example, the server may be the host device 105H.

According to this embodiment, the simulation contents may comprise a plurality of sets of one or more simulation contents (e.g. VR contents) corresponding to a plurality of sets of one or more commercial products, respectively, and each set of the plurality of sets of one or more simulation contents corresponds to one set of the plurality of sets of one or more commercial products. The specific service may be related to ordering at least one commercial product within the plurality of sets of one or more commercial products. For example, the plurality of sets of one or more commercial products may be a plurality of sets of food, respectively, and the plurality of sets of one or more simulation contents may be designed as a plurality of sets of virtual food objects corresponding to the plurality of sets of food, respectively, for allowing the user to take the second controller such as that of the controller type B (e.g. a virtual object emulating the tray for putting food thereon) with one or more virtual food objects being put on the second controller in the simulation environment. The user may switch between different sets within the sets of one or more simulation contents, for selecting the food that the user would like to order. Thus, this model presentation control scheme allows the user to ask for information of at least one set of the plurality of sets of one or more commercial products from the specific service with aid of the other first controller such as the right hand controller, and virtually hold the food models with the second controller (e.g. a virtual tray such as the virtual object emulating the tray) in the left hand.

According to some embodiments, this model presentation control scheme may be applied to the right hand side of the user in the simulation environment. When the user uses one hand (e.g. the left hand, with aid of the left hand controller) to enter the specific service and/or select something to be ordered, the processing circuit 110P may change the format of the controller of the other hand in the simulation environment (e.g. the right hand controller) and switch between the three-dimensional (3D) models of food that are virtually put thereon, for the user's reference.

Figure 5:
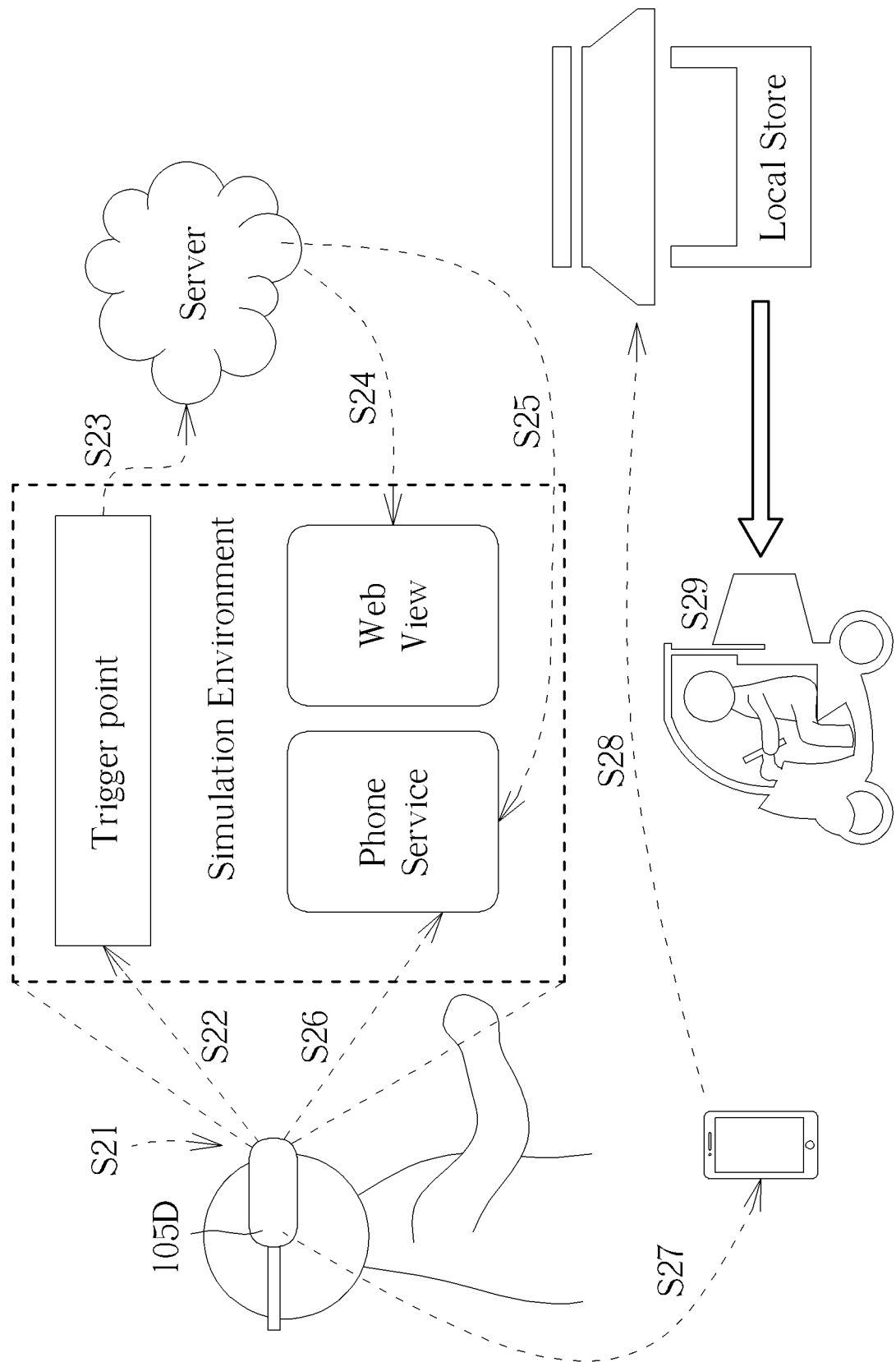
FIG. 5 illustrates a dial out control scheme applied to the simulation system shown in FIG. 1 according to an embodiment of the present application.

FIG. 5 illustrates a dial out control scheme applied to the simulation system 100 shown in FIG. 1 according to an embodiment of the present application.

In Step S21, under control of the processing circuit 110P, the HMD device 105D may present a specific virtual region in the simulation environment, to allow the user to enter the specific virtual region in the simulation environment.

In Step S22, the processing circuit 110P may control the HMD device 105D to display the service trigger object (e.g. the trigger point shown in FIG. 5) in the simulation environment at a certain time slot for the user to interactive with. For example, this may be implemented by getting the system time and determining whether the current time matches the certain time slot base on timer setting in program code(s).

In Step S23, when the specific service is triggered (e.g. the trigger point activated), the processing circuit 110P controls the host device 105H to send a request such as that mentioned above to the server and provide user location information.

In Step S24, the server provides a webpage (e.g. a webpage comprising the menu, etc.) based on the user location, and the processing circuit 110P controls the HMD device 105D to display the webpage in a web view object (e.g. the web view shown in FIG. 5) that allows web browsing (e.g. VR web browsing) in the simulation environment. For example, the webpage may be described with Virtual Reality Modeling Language (VRML), or any other language that is suitable for handling contents of the webpage for web browsing (e.g. VR web browsing) in the simulation environment. According to some embodiments, the contents of the webpage may be generated or edited with a 3D tool. Examples of the 3D tool may include, but are not limited to: Unity3D, Quest3D, 3D VIA Virtools, etc.

In Step S25, the server provides the phone number of a local store nearby based on the user location, and the processing circuit 110P controls the HMD device 105D to display the phone number of the local store in the phone service.

In Step S26, the user enters the phone service and gets the phone number in the simulation environment.

In Step S27, the processing circuit 110P controls the host device 105H to wirelessly connect to a mobile phone, via Bluetooth technology, for example, to trigger the mobile phone to dial out.

In Step S28, the mobile phone dials out to the local store.

In Step S29, as a result of the above operations, the local store provides food through the delivery service.

According to some embodiments, based on the dial out control scheme, when the user is playing a VR game and it is dinning time in the real world, the user may get, in the simulation environment, a banner that notifies the user and recommends the user to get some food. If the user is interested in it, the user may trigger the specific service through the banner and may get an online menu in the simulation environment, and store the phone number that is nearby and/or dial out directly in the simulation environment. For example, the user may check the online menu and directly dial out with the stored phone number to order pizza delivery within the simulation environment without taking off the HMD device 105D. Once the user finishes the phone call, the user may get back to the game play immediately. The whole of the specific service can be done without leaving simulation environment.

According to some embodiments, the mobile phone may be integrated into the host device 105H. According to some embodiments, the mobile phone, the host device 105H, and the HMD device 105D may be integrated into the same device.

According to some embodiments, the phone service mentioned above may be integrated into the web view shown in FIG. 5. According to some embodiments, the phone service mentioned above may be replaced with a web ordering function within the web view object. According to some embodiments, the phone service mentioned above may be replaced with a web ordering function in the webpage.

Figure 6:
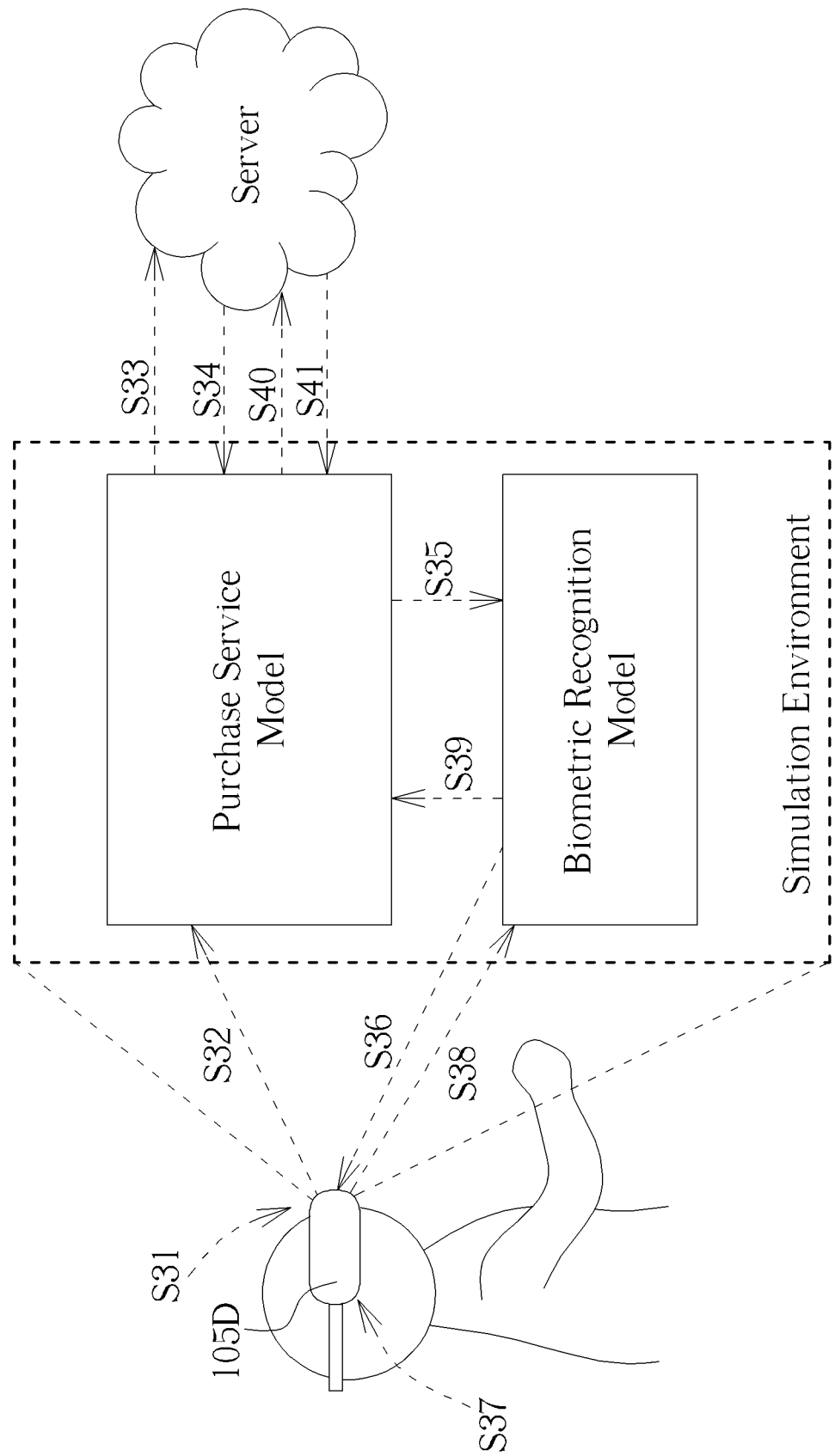
FIG. 6 illustrates an authorization control scheme applied to the simulation system shown in FIG. 1 according to an embodiment of the present application.

FIG. 6 illustrates an authorization control scheme applied to the simulation system 100 shown in FIG. 1 according to an embodiment of the present application.

In Step S31, under control of the processing circuit 110P, the HMD device 105D may present a specific virtual region in the simulation environment, to allow the user to enter the specific virtual region in the simulation environment and see a purchase service model (e.g. a VR object) and a biometric recognition model (e.g. another VR object) in the simulation environment. For example, the purchase service model may be designed to have some features of a browser.

In Step S32, the user may activate the purchase service model in the simulation environment.

In Step S33, under control of the processing circuit 110P, the purchase service model may send the user's purchase request to a server such as that mentioned above.

In Step S34, the server requests the user's personal identity from the purchase service model.

In Step S35, the purchase service model requests the user's personal identity from the biometric recognition model.

In Step S36, the biometric recognition model requests the user's biometric recognition information with aid of the HMD device 105D. For example, the HMD device 105D may be equipped with cameras for capturing eye images (e.g. pupil) of the user's eyes when the user is looking toward the biometric recognition model in the simulation environment. The HMD device 105D may comprise a biometric recognition processing circuit corresponding to the biometric recognition model. The biometric recognition processing circuit may be configured to process the eye images to generate the user's biometric recognition information according to the eye images. This may be implemented with retina recognition technologies. Thus, in this step, the biometric recognition processing circuit may control the HMD device 105D to display a message asking the user to look toward the biometric recognition model in the simulation environment.

In Step S37, the user inputs biometric recognition information into the biometric recognition model with aid of the HMD device 105D. For example, the user may just look toward the biometric recognition model in the simulation environment, to allow the eye images to be captured.

In Step S38, the biometric recognition model (more specifically, the biometric recognition processing circuit) extracts the biometric recognition information from the eye images, and determines the user's personal identity according to the biometric recognition information of the user.

In Step S39, the biometric recognition model (more specifically, the biometric recognition processing circuit) sends the user's personal identity to the purchase service model.

In Step S40, the purchase service model sends the user's personal identity to the server through the host device 105H.

In Step S41, the server confirms the user's personal identity and sends purchase success data back to the purchase service model. As a result, the action of ordering product (s) in the specific service may be completed.

According to some embodiments, the biometric recognition may be implemented with any of other types of biometric recognition technologies (e.g. fingerprint recognition, etc.). For example, the HMD device 105D may be equipped with a fingerprint capturing module, for capturing one or more fingerprint images of the user's finger(s) when the user uses his/her finger(s) to touch the input window of the fingerprint capturing module. The fingerprint capturing module may comprise a prism to be utilized as the input window, and a camera for capturing the one or more fingerprint images through the prism. The biometric recognition processing circuit may be configured to process the fingerprint images to generate the user's biometric recognition information according to the one or more fingerprint images. This may be implemented with retina recognition technologies. Thus, in Step S36, the biometric recognition processing circuit may control the HMD device 105D to display, in the simulation environment, a message asking the user to put his/her finger(s) onto touch the input window of the fingerprint capturing module. For brevity, similar descriptions for these embodiments are not repeated in detail here.

Based on the authorization control scheme, the user may easily use the biometric recognition component (such as that for the fingerprint recognition, the retina recognition, etc.) on the HMD device 105D to finish his/her online purchasing in the simulation environment. The user does not need to input complicated password (s) or credit card information in the specific service.

Figure 7:
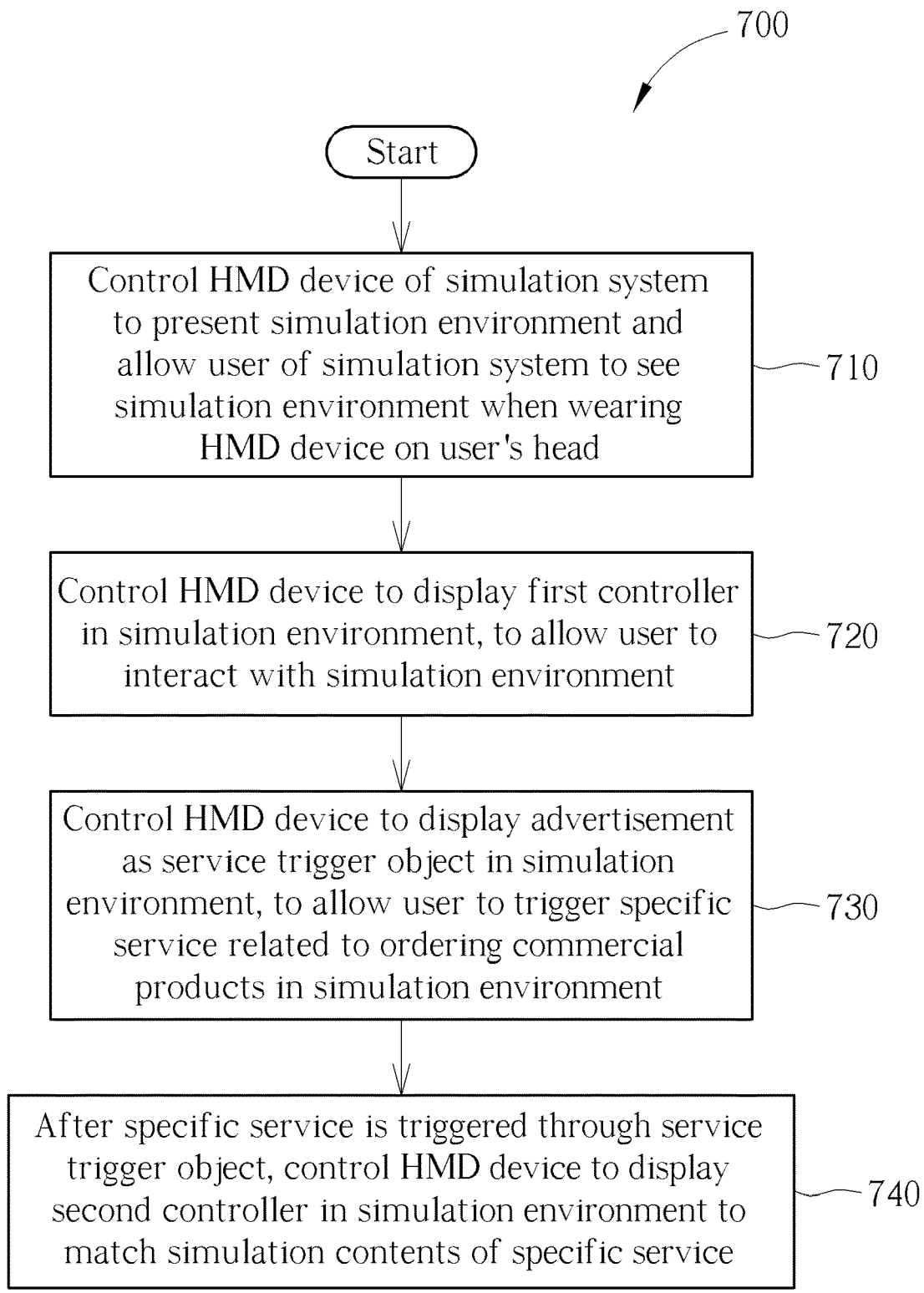
FIG. 7 is a flowchart of a method for providing customized information through advertising in a simulation environment according to an embodiment of the present application.

FIG. 7 is a flowchart of a method 700 for providing customized information through advertising in a simulation environment according to an embodiment of the present application. The method 700 can be applied to the simulation system 100 shown in FIG. 1, and can be applied to the host device 105H (more particularly, the processing circuit 110P) and the HMD device 105D. The method may be described as follows.

In Step 710, the processing circuit 110P controls the HMD device 105D to present the simulation environment and allow the user of the simulation system 100 to see the simulation environment when wearing the HMD device 105D on the user's head.

In Step 720, the processing circuit 110P controls the HMD device 105D to display the first controller (e.g. the controller of "controller type A" as shown in FIG. 4) in the simulation environment to allow the user to interact with the simulation environment.

In Step 730, the processing circuit 110P controls the HMD device 105D to display the advertisement as the service trigger object (e.g. the trigger point shown in FIG. 4) in the simulation environment, to allow the user to trigger the specific service related to ordering the commercial products in the simulation environment.

In Step 740, after the specific service is triggered through the service trigger object, the processing circuit 110P controls the HMD device 105D to display the second controller (e.g. the controller of "controller type B" as shown in FIG. 4) in the simulation environment to match the simulation contents (e.g. VR contents) of the specific service, where the aforementioned first controller (such as the left hand controller described in the embodiment shown in FIG. 4) is replaced with the second controller in the specific service. Please note that the first controller mentioned in Step 720 and the second controller mentioned in Step 740 are virtual controllers corresponding to the same physical controller (e.g. one of the two physical controllers of the simulation system 100).

According to this embodiment, when the user asks for information of a specific set of one or more commercial products within the plurality of sets of one or more commercial products from the specific service, the processing circuit 110P controls the HMD device 105D to display the combination of the second controller and a specific set of one or more simulation contents in the simulation environment. The specific set of one or more simulation contents may correspond to the specific set of one or more commercial products, and the plurality of sets of one or more simulation contents may comprise the specific set of one or more simulation contents. For example, the combination of the second controller and the specific set of one or more simulation contents may indicate that the specific set of one or more simulation contents (e.g. food model(s)) is put on the second controller (e.g. the virtual tray such as the virtual object emulating the tray) in the simulation environment.

In addition, the processing circuit 110P is capable of requesting at least one set of the plurality of sets of one or more simulation contents from the server that provides the specific service (which is typically positioned outside the simulation system 100), obtaining the aforementioned at least one set of the plurality of sets of one or more simulation contents from the server, and controlling the HMD device 105D to display the aforementioned at least one set of the plurality of sets of one or more simulation contents. For example, when the user asks for information of the specific set of one or more commercial products within the plurality of sets of one or more commercial products from the specific service, the processing circuit 110P may request the specific set of one or more simulation contents that corresponds to the specific set of one or more commercial products from the server, wherein the at least one set of the plurality of sets of one or more simulation contents comprises the specific set of one or more simulation contents.

Under control of the processing circuit 110P, the simulation system 100 may operate according to one or more of various control schemes of the method 700 (e.g. the model presentation control scheme, the dial out control scheme, and the authorization control scheme). Some implementation details regarding the method 700 are described in one or more of the above embodiments. For brevity, similar descriptions for this embodiment are not repeated in detail here.

According to some embodiments, the specific service may be related to ordering a specific type of products in the simulation environment, such as food products, and the second controller matches the specific type of products. For example, the processing circuit 110P is capable of controlling the HMD device 105D to display another advertisement as another service trigger object (e.g. a banner, a virtual button, etc.) in the simulation environment, to allow the user to trigger another service related to ordering another type of products in the simulation environment. After the other service is triggered through the other service trigger object, the processing circuit 110P controls the HMD device 105D to display a third controller (e.g. a controller of the controller type C, which is different from each of the controller types A and B) in the simulation environment to match simulation contents of the other service, wherein the first controller is replaced with the third controller in the other service, and the third controller matches the other type of products. For example, the controller type C may be designed to have the shape of a cart.

According to some embodiments, the second controller may have a shape emulating a product carrier (e.g. the tray, the cart, a bag, etc.) for carrying at least one commercial product of the commercial products, to allow the user to put at least one simulation content corresponding to the at least one commercial product on or into the second controller in the simulation environment.

Figure 8:
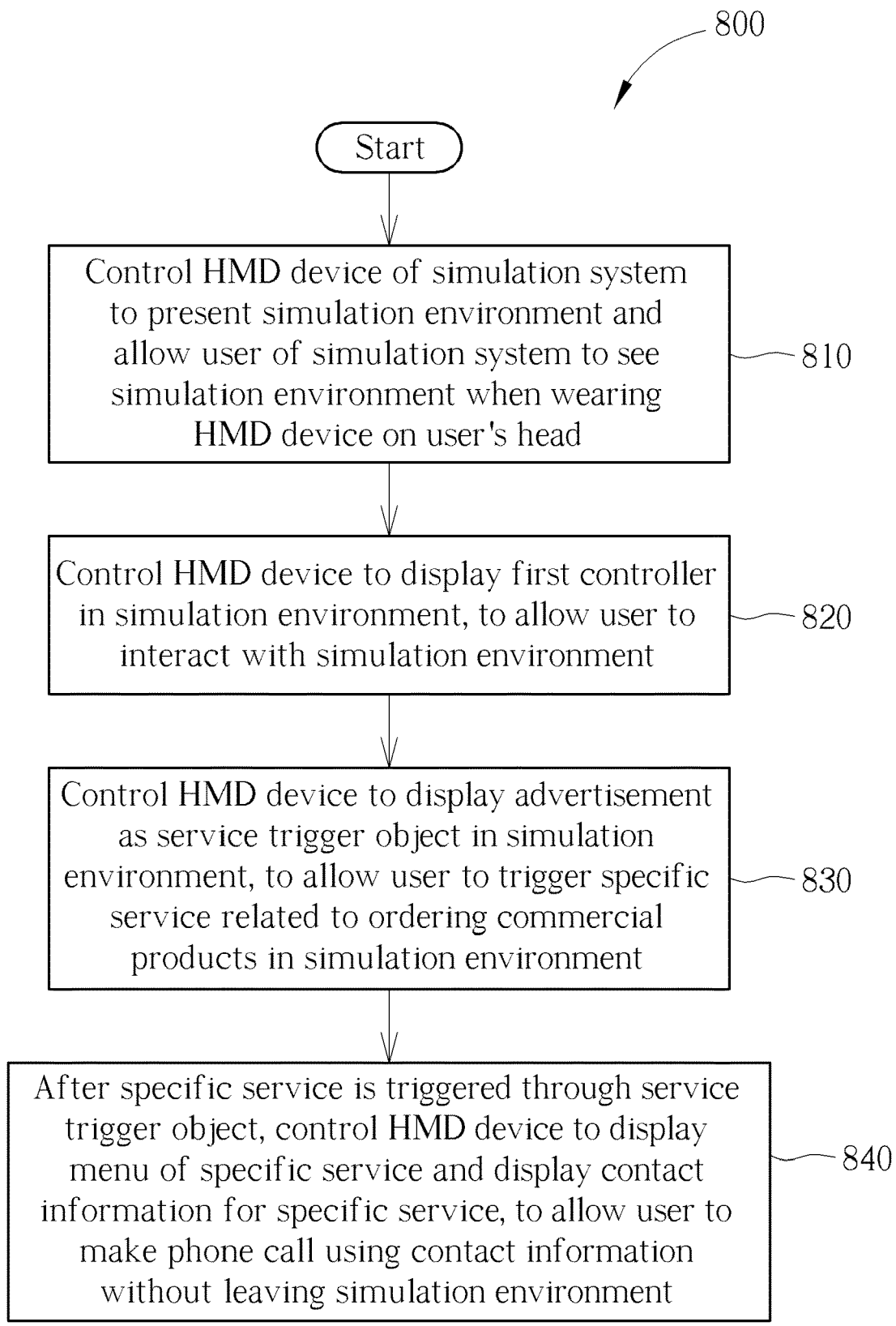
FIG. 8 is a working flow of the method shown in FIG. 7 according to an embodiment of the present application.

FIG. 8 is a working flow 800 of the method 700 shown in FIG. 7 according to an embodiment of the present application.

In Step 810, the processing circuit 110P controls the HMD device 105D to present the simulation environment and allow the user of the simulation system 100 to see the simulation environment when wearing the HMD device 105D on the user's head.

In Step 820, the processing circuit 110P controls the HMD device 105D to display the first controller (e.g. the controller of "controller type A" as shown in FIG. 4) in the simulation environment to allow the user to interact with the simulation environment.

In Step 830, the processing circuit 110P controls the HMD device 105D to display the advertisement as the service trigger object (e.g. the trigger point shown in FIG. 4) in the simulation environment, to allow the user to trigger the specific service related to ordering the commercial products in the simulation environment.

In Step 840, after the specific service is triggered through the service trigger object, the processing circuit 110P controls the HMD device 105D to display the menu of the specific service and display contact information (e.g. the phone number of the local store) for the specific service, to allow the user to make a phone call using the contact information without leaving the simulation environment.

According to this embodiment, a biometric detector may be embedded in the simulation system, and more particularly, may be integrated into the HMD device 105D. The biometric detector may comprise one or more biometric recognition components (e.g. the cameras mentioned in the embodiment shown in FIG. 6 and/or the fingerprint capturing module). For example, biometric detector may further comprise the biometric recognition model and/or the biometric recognition processing circuit. In addition, the simulation system 100 may utilize the biometric detector to detect biometric characteristics of the user, and may perform biometric recognition on the biometric characteristics (e.g. with aid of the biometric detector) for the authentication procedure of the specific service, to allow the user to order at least one of the commercial products in the simulation environment without inputting credit card information (e.g. a credit card number) and/or password(s).

Under control of the processing circuit 110P, the simulation system 100 may operate according to one or more of various control schemes of the method 700 (e.g. the model presentation control scheme, the dial out control scheme, and the authorization control scheme). Some implementation details regarding the working flow 800 are described in one or more of the above embodiments. For brevity, similar descriptions for this embodiment are not repeated in detail here.

Figure 9:
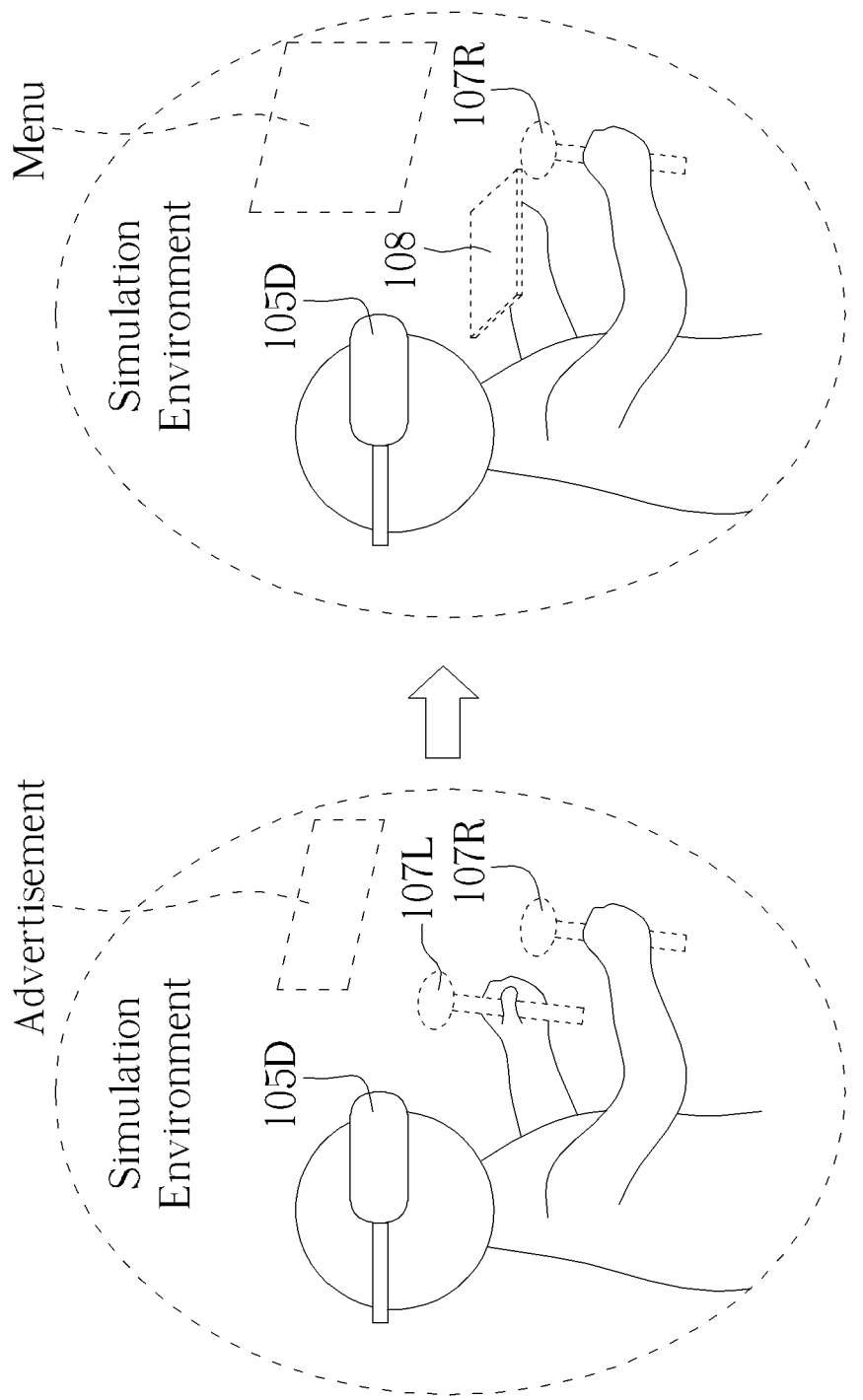
FIG. 9 illustrates some implementation details of the method shown in FIG. 7 according to an embodiment of the present application.

FIG. 9 illustrates some implementation details of the method 700 shown in FIG. 7 according to an embodiment of the present application. As shown in the left half of FIG. 9, the user may virtually hold the VR objects 107L and 107R in his/her left hand and right hand in the simulation environment, respectively. The VR objects 107L and 107R can be taken as examples of controllers of the controller type A. According to this embodiment, before the specific service is triggered through the service trigger object mentioned in Step 730 (e.g. the advertisement shown in FIG. 9, such as a banner), both of the left hand controller and the right hand controller are displayed as the controller type A (e.g. the VR objects 107L and 107R, respectively). When the user is interested in this advertisement, the user may use one of the two controllers, such as the right hand controller (e.g. the VR object 107R) in this embodiment, to trigger the specific service through the service trigger object (e.g. the banner). When the specific service is triggered, the processing circuit 110P controls the host device 105H to send the request to the server that provides the specific service. The server receives the request and sends back the associated VR contents to the host device 105H, where the associated VR contents may comprise the virtual menu contents of the menu, and may further comprise the VR contents of the controller type B, such as that of the VR object 108.

As shown in the right half of FIG. 9, the processing circuit 110P may control the HMD device 105D to display the menu and the VR object 108 (e.g. the virtual tray), and the VR object 108 replaces the VR object 107L of this embodiment. As the VR object 108 replaces the VR object 107L, the VR object 108 can be taken as an example of the second controller mentioned in Step 740, and the VR object 107L can be taken as an example of the first controller mentioned in Step 720. After the operation of Step 740, the left hand controller is displayed as the controller type B (e.g. the VR object 108), while the right hand controller is displayed as the controller type A (e.g. the VR object 107R). For example, the size and the shape of the VR object 108 may be designed to be similar to that of the tray for putting food thereon. For brevity, similar descriptions for this embodiment are not repeated in detail here.

Figure 10:
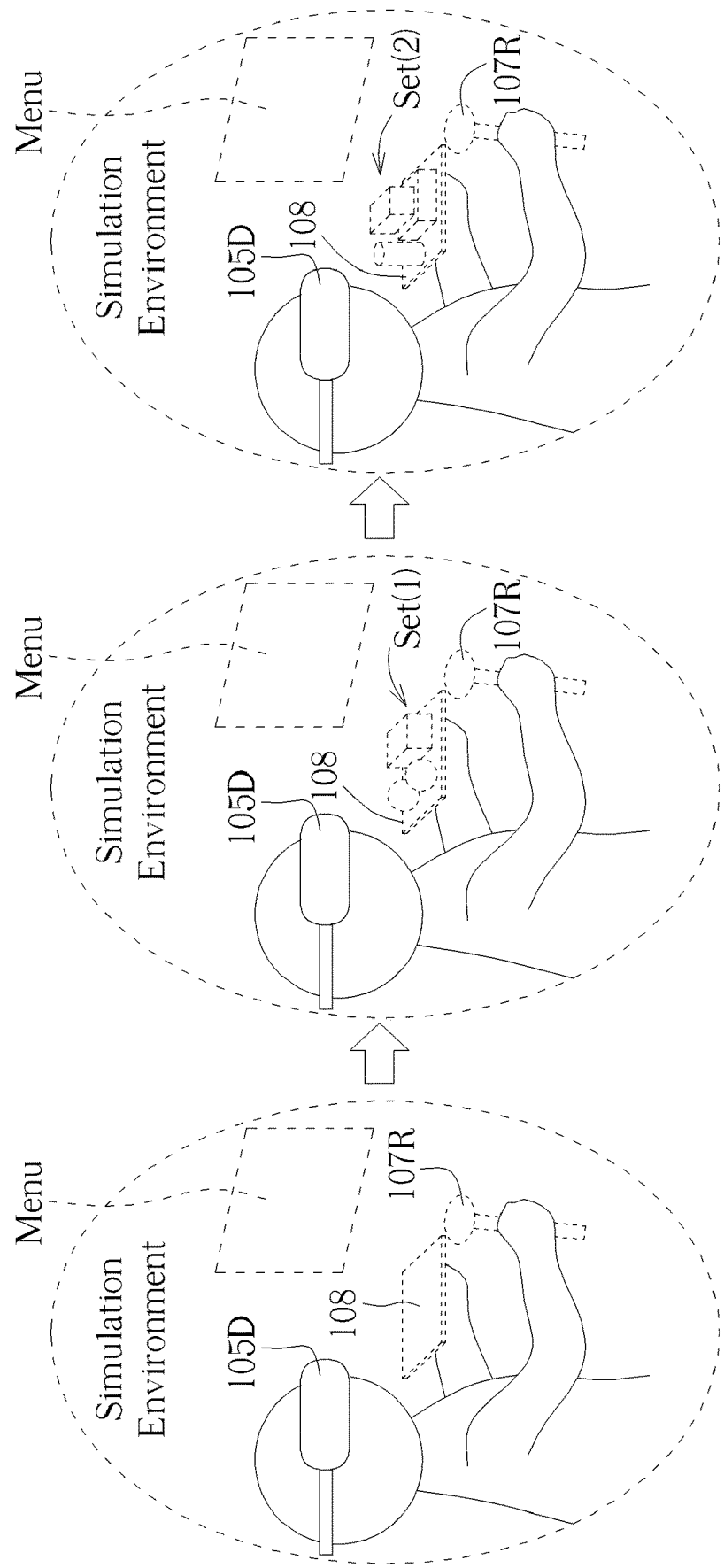
FIG. 10 illustrates some implementation details of the method shown in FIG. 7 according to an embodiment of the present application.

FIG. 10 illustrates some implementation details of the method 700 shown in FIG. 7 according to an embodiment of the present application. For example, in the menu within the simulation environment shown in the left-hand side of FIG. 10, there may be multiple items that represent the sets of one or more commercial products, respectively, such as a first item representing a first set of one or more commercial products (e.g. a first set of food) and a second item representing a second set of one or more commercial products (e.g. a second set of food). When the user uses the right hand controller (e.g. the VR object 107R) to select the first item, the processing circuit 110P may control the HMD device 105D to display a first set of VR object Set(1) (e.g. a set of virtual food objects put on the VR object 108 such as the virtual tray) corresponding to the first set of one or more commercial products (e.g. the first set of food). When the user uses the right hand controller (e.g. the VR object 107R) to select the second item, the processing circuit 110P may control the HMD device 105D to display a second set of VR object Set(2) (e.g. another set of virtual food objects put on the VR object 108 such as the virtual tray) corresponding to the second set of one or more commercial products (e.g. the second set of food).

Please note that the first set of food may be taken as an example of the specific set of one or more commercial products in the embodiment shown in FIG. 7. In this situation, the first set of VR object Set(1) may be taken as an example of the specific set of one or more simulation contents. In addition, the second set of food may be taken as another example of the specific set of one or more commercial products in the embodiment shown in FIG. 7. In this situation, the second set of VR object Set (2) may be taken as another example of the specific set of one or more simulation contents. As shown in FIG. 10, the user may switch between different sets within the sets of one or more simulation contents, such as the first set of VR object Set(1), the second set of VR object Set(2), etc., for selecting the food that the user would like to order. Thus, the model presentation control scheme of the method 700 allows the user to virtually hold the food models, such as the first set of VR object Set(1) or the second set of VR object Set(2) that is put on the VR object 108 (e.g. the virtual tray). For brevity, similar descriptions for this embodiment are not repeated in detail here.

According to some embodiments, each of the VR system 10 shown in FIG. 2 and the VR system shown in FIG. 3 may be configured to become an AR system or an MR system, any of which can be taken as an example of the simulation system 100. For example, the HMD apparatus 104 shown in FIG. 2 may comprise one or more cameras arranged to capture images of the real space, such as images of what may be seen by the user in the real space if the user takes off the HMD apparatus 104. The HMD apparatus 104 may send at least one portion (e.g. a portion or all) of image data of these images of the real space to the host device 102 through the transmission cable 106 (e.g. through a wired connection such as that for the information $INFO_S$). According to the aforementioned at least one portion (e.g. a portion or all) of the image data, the HMD apparatus 104 (more particularly, the processor of the computing device therein) may blend any of these images of the real space with the video content obtained from the multimedia source or the video content of one or more virtual objects to be viewed by the user wearing the HMD apparatus 104, to generate the multimedia content CXT. As a result, the VR environment presented through the HMD apparatus 104 shown in FIG. 2 becomes the associated AR environment or the associated MR environment. For another example, the HMD apparatus 30 shown in FIG. 3 may comprise one or more cameras arranged to capture images of the real space, such as images of what may be seen by the user in the real space if the user takes off the HMD apparatus 30. The HMD apparatus 30 may send at least one portion (e.g. a portion or all) of image data of these images of the real space to the host device 20 through wireless transmission (e.g. through a wireless connection such as that for the information $INFO_S$). According to the aforementioned at least one portion (e.g. a portion or all) of the image data, the HMD apparatus 30 (more particularly, the processor of the computing device therein) may blend any of these images of the real space with the video content obtained from the multimedia source or the video content of one or more virtual objects to be viewed by the user wearing the HMD apparatus 30, to generate the multimedia content CXT. As a result, the VR environment presented through the HMD apparatus 30 shown in FIG. 3 becomes the associated AR environment or the associated MR environment. For brevity, similar descriptions for these embodiments are not repeated in detail here.

Regarding the terms AR and MR, MR may be regarded as the merging of real and virtual worlds to produce new environments and visualizations where physical and digital objects may, for example, co-exist and/or interact in real time. MR may take place in the physical world and/or the virtual world, and may be a mix of reality and VR, encompassing both AR and augmented virtuality. According to some embodiments of the present invention, the degree, the percentage, and/or the way of the above blending operation(s) may cause whether the VR environment becomes the AR environment or the MR environment. For brevity, similar descriptions for these embodiments are not repeated in detail here.

According to some embodiments, the host device 105H and the HMD device 105D may be integrated into the same device, such as a simulation device, and the processing circuit 110P may control operations of this device. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for providing customized information through advertising in a simulation environment, the method being applicable to a simulation system, the simulation system being one of a virtual reality (VR) system, an augmented reality (AR) system, and a mixed reality (MR) system, the method comprising:
    controlling a head mounted display (HMD) device of the simulation system to present the simulation environment and allow a user of the simulation system to see the simulation environment when wearing the HMD device on the user's head;
    controlling the HMD device to display a first controller in the simulation environment, to allow the user to interact with the simulation environment;
    controlling the HMD device to display an advertisement as a service trigger object in the simulation environment, to allow the user to trigger a specific service in the simulation environment;
    after the specific service is triggered through the service trigger object, controlling the HMD device to display a second controller in the simulation environment to match simulation contents of the specific service, wherein the first controller is replaced with the second controller in the simulation environment, and the second controller allows the user to interact with the specific service, wherein the simulation contents comprise a plurality of sets of one or more simulation contents corresponding to a plurality of sets of one or more commercial products, respectively, and each set of the plurality of sets of one or more simulation contents corresponds to one set of the plurality of sets of one or more commercial products; and the specific service is related to ordering at least one commercial product within the plurality of sets of one or more commercial products;
    controlling the HMD device to display another first controller in the simulation environment to allow the user to interact with the simulation environment; and
    controlling the HMD device to display a menu to allow the user to ask for information of at least one set of the plurality of sets of one or more commercial products from the specific service with aid of the other first controller.

2. The method of claim 1, wherein the first controller is a virtual controller corresponding to a physical controller of the simulation system, and the other first controller is a virtual controller corresponding to another physical controller of the simulation system.

3. The method of claim 1, further comprising:
    when the user asks for information of a specific set of one or more commercial products within the plurality of sets of one or more commercial products from the specific service, controlling the HMD device to display a combination of the second controller and a specific set of one or more simulation contents in the simulation environment, wherein the specific set of one or more simulation contents corresponds to the specific set of one or more commercial products, and the plurality of sets of one or more simulation contents comprise the specific set of one or more simulation contents.

4. The method of claim 3, wherein the combination of the second controller and the specific set of one or more simulation contents indicates that the specific set of one or more simulation contents is put on the second controller in the simulation environment.

5. The method of claim 1, further comprising:
    requesting at least one set of the plurality of sets of one or more simulation contents from a server that provides the specific service, wherein the server is positioned outside the simulation system; and obtaining the at least one set of the plurality of sets of one or more simulation contents from the server, and controlling the HMD device to display the at least one set of the plurality of sets of one or more simulation contents.

6. The method of claim 5, further comprising:
when the user asks for information of a specific set of one or more commercial products within the plurality of sets of one or more commercial products from the specific service, requesting a specific set of one or more simulation contents that corresponds to the specific set of one or more commercial products from the server, wherein the at least one set of the plurality of sets of one or more simulation contents comprises the specific set of one or more simulation contents.

7. The method of claim 1, wherein the first controller is a virtual controller corresponding to a physical controller of the simulation system, and the second controller is another virtual controller corresponding to the physical controller of the simulation system.

8. The method of claim 1, wherein the specific service is related to ordering a specific type of products in the simulation environment, and the second controller matches the specific type of products.

9. The method of claim 8, further comprising:
controlling the HMD device to display another advertisement as another service trigger object in the simulation environment, to allow the user to trigger another service related to ordering another type of products in the simulation environment; and
after the other service is triggered through the other service trigger object, controlling the HMD device to display a third controller in the simulation environment to match simulation contents of the other service, wherein the first controller is replaced with the third controller in the other service, and the third controller matches the other type of products.

10. The method of claim 1, wherein the specific service is related to ordering commercial products; and the second controller has a shape emulating a product carrier for carrying at least one commercial product of the commercial products, to allow the user to put at least one simulation content corresponding to the at least one commercial product on or into the second controller in the simulation environment.

11. A simulation system for providing customized information through advertising in a simulation environment, the simulation system being one of a virtual reality (VR) system, an augmented reality (AR) system, and a mixed reality (MR) system, the simulation system comprising:
a head mounted display (HMD) device, configured to present the simulation environment and allow a user of the simulation system to see the simulation environment when wearing the HMD device on the user's head; and
a processing circuit, coupled to the HMD device, configured to perform information processing for the HMD device, wherein the processing circuit controls the HMD device to perform the following operations:
displaying a first controller in the simulation environment to allow the user to interact with the simulation environment;
displaying an advertisement as a service trigger object in the simulation environment, to allow the user to trigger a specific service in the simulation environment; and
after the specific service is triggered through the service trigger object, displaying a second controller in the simulation environment to match simulation contents of the specific service, wherein the first controller is replaced with the second controller in the specific service, and the second controller allows the user to interact with the specific service;
wherein the simulation contents comprise a plurality of sets of one or more simulation contents corresponding to a plurality of sets of one or more commercial products, respectively, and each set of the plurality of sets of one or more simulation contents corresponds to one set of the plurality of sets of one or more commercial products; and the specific service is related to ordering at least one commercial product within the plurality of sets of one or more commercial products;
wherein the processing circuit controls the HMD device to display another first controller in the simulation environment to allow the user to interact with the simulation environment; and the processing circuit controls the HMD device to display a menu to allow the user to ask for information of at least one set of the plurality of sets of one or more commercial products from the specific service with aid of the other first controller.

12. The simulation system of claim 11, wherein when the user asks for information of a specific set of one or more commercial products within the plurality of sets of one or more commercial products from the specific service, the processing circuit controls the HMD device to display a combination of the second controller and a specific set of one or more simulation contents in the simulation environment, wherein the specific set of one or more simulation contents corresponds to the specific set of one or more commercial products, and the plurality of sets of one or more simulation contents comprise the specific set of one or more simulation contents.

13. The simulation system of claim 11, wherein the processing circuit requests at least one set of the plurality of sets of one or more simulation contents from a server that provides the specific service, and the server is positioned outside the simulation system; and the processing circuit obtains the at least one set of the plurality of sets of one or more simulation contents from the server, and controls the HMD device to display the at least one set of the plurality of sets of one or more simulation contents.

14. The simulation system of claim 11, wherein the processing circuit is integrated into the HMD device.

* * * * *